United States Patent [19]

Fischer

[11] 4,135,081
[45] Jan. 16, 1979

[54] ELECTRIC COOKING PLATE WITH A TEMPERATURE LIMITER

[76] Inventor: Karl Fischer, Am Gaensberg, 7519 Oberderdingen, Fed. Rep. of Germany

[21] Appl. No.: 705,364

[22] Filed: Jul. 14, 1976

[51] Int. Cl.² .............................................. H05B 3/68
[52] U.S. Cl. .................................... 219/449; 219/512; 337/386
[58] Field of Search ............... 219/449, 450, 451, 452, 219/494, 512; 337/333, 383, 386

[56] References Cited

U.S. PATENT DOCUMENTS

| | | | |
|---|---|---|---|
| 1,963,655 | 6/1934 | Fichtner | 219/512 |
| 2,666,836 | 1/1954 | Stiebel | 219/512 X |
| 2,891,125 | 6/1959 | Miller | 337/386 |
| 2,978,564 | 4/1961 | Blanding et al. | 219/449 |
| 3,051,807 | 8/1962 | Huffman | 337/386 |
| 3,072,773 | 1/1963 | Clapp | 219/512 X |
| 3,253,124 | 5/1966 | Brohl | 219/449 |
| 3,666,920 | 5/1972 | Price | 219/449 |
| 3,719,798 | 3/1973 | Nelson et al. | 219/512 |
| 3,739,149 | 6/1973 | Fischer et al. | 219/449 X |
| 3,821,683 | 6/1974 | Bowling | 337/386 |

FOREIGN PATENT DOCUMENTS

| | | | |
|---|---|---|---|
| 214543 | 4/1961 | Austria | 219/449 |
| 93365 | 7/1962 | Denmark | 219/449 |
| 283077 | 3/1915 | Fed. Rep. of Germany. | |
| 756796 | 4/1952 | Fed. Rep. of Germany. | |
| 886501 | 8/1953 | Fed. Rep. of Germany | 219/449 |
| 1123059 | 8/1962 | Fed. Rep. of Germany. | |
| 1288704 | 2/1964 | Fed. Rep. of Germany | 219/449 |
| 070184 | 12/1970 | Fed. Rep. of Germany. | |
| 2422623 | 11/1975 | Fed. Rep. of Germany | 219/449 |
| 1340422 | 9/1963 | France. | |
| 1212941 | 11/1970 | United Kingdom | 219/449 |

Primary Examiner—Volodymyr Mayewsky
Attorney, Agent, or Firm—J. Rodman Steele, Jr.

[57] ABSTRACT

A temperature limiter used as part of, or otherwise in combination with, an electric cooking plate. An improved switching hysteresis is enabled by a unique construction in which a laterally open recess is formed in a one-piece housing to receive a snap switch, the counter-contact of which is fixidly secured in slot structure adjacent said recess. A transmission rod is arranged within an expansion sleeve and is positioned to be spring biased through engagement with the spring of a snap switch.

22 Claims, 10 Drawing Figures

SWITCHING-ON ●
SWITCHING-OFF ○

— SWITCHED ON
= SWITCHED OFF

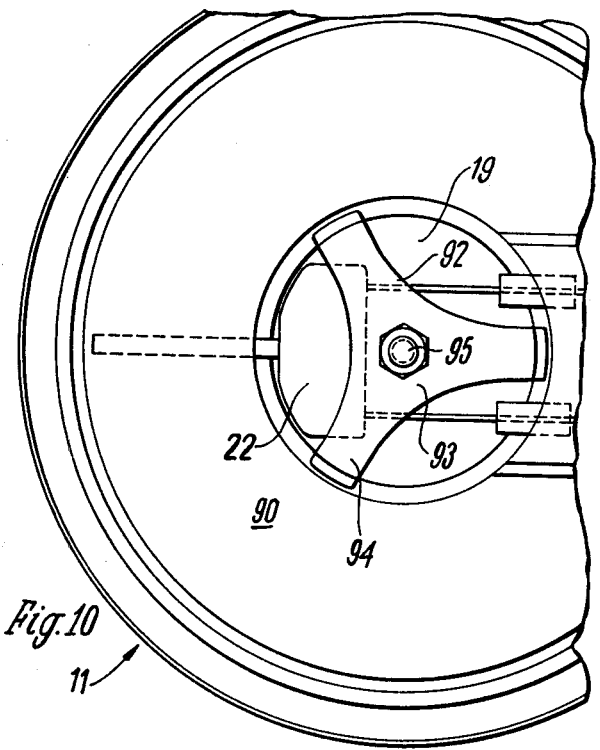
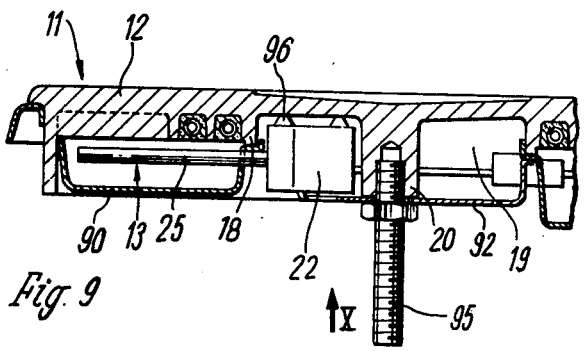

ELECTRIC COOKING PLATE WITH A TEMPERATURE LIMITER

BACKGROUND OF THE INVENTION

The present invention relates to a temperature limiter, especially for use in combination with an electric cooking plate.

From German Pat. No. 1,123,059, it is generally known to construct a temperature limiter which has a one-piece housing made of insulating material with a recess which can be closed by a cover. In the recess a bimetal and snap switch as well as a counter-contact of the snap switch are fastened by laterally inserting them into slots. This temperature limiter has, since it works with the bimetal, a relatively high switching hysteresis, i.e., the temperature difference between switching off and subsequently switching on is relatively high. Bimetals are very unstable in high temperature ranges of about 300° – 400° C. and have no great actuating power. The force for switching off the snap switch can, for this reason, only be provided after the elasticity of the bimetal had been overcome.

Furthermore from German Pat. No. 756,796, an electric switch is known which has a temperature detector consisting of a sleeve and a rod which have different co-efficients of expansion. Additionally, a switch with a switch spring and a spring tongue being prestressed by buckling strain are provided. The snap switch and the temperature detector are, however, mounted freely and without housing on sheet metal parts. Apart from the fact that the switch does not work like a snap switch but is given a "creeping" contact, elasticities influence the accuracy of the switching.

SUMMARY OF THE INVENTION

It is the basic object of the invention to provide a temperature limiter which is easy to produce and which works, with a very small switching hysteresis, accurately and reliably.

The temperature limiter disclosed herein has a one-piece housing constructed of solid isolating material which is provided with a laterally open recess in which the snap switch with its counter-contact is fixed by a lateral insertion of fastening parts into slots of the housing adjacent to the recess. A temperature detector projects from the housing and comprises an expansion sleeve in which is arranged a transmission rod. At least one flange of the sleeve is inserted into a slot of the housing for fastening the sleeve, the slot being adjacent to the laterally open passage for the sleeve. A cover closes an otherwise open side of the recess and the passage. The transmission rod is in the form of a pressure rod which is spring-biased, whereby the pressure rod acts, responsive to the snap spring of the snap switch.

Due to the unique construction which will be subsequently described in detail, it is possible to provide a temperature limiter which has a switching hysteresis, i.e., a temperature difference between switching off and subsequent switching on, of only approximately 10 degrees centigrade, in a relatively high temperature range of, for example, 400° Celsius. This condition can be achieved although an expansion sleeve constructed of stainless steel for example and measuring only approximately 45 mm in length is utilized. On the other hand, known temperature regulators had a switching hysteresis of approximately 80 degrees centigrade.

As taught by the subject invention, expansion elements with very small expansion ways are utilized in connection with which normally a greater switching hysteresis was to be feared. Due to the basic idea of the invention, the pressing towards each other of all construction parts, including the housing, by the snap spring of the snap switch, all dead paths and tendencies to inaccuracies or elasticities are eliminated in advance. A result is that despite expansion ways which are lying a ten power beyond the expansion values of a abimetal, an essentially smaller switching hysteresis, combined with a greater switching accuracy, can be obtained with the temperature limiter according to the invention.

Due to the one piece housing not only is an easy fixing by a simple insertion possible, but also elasticities or dead paths in the separating joint necessary in other switches are eliminated. The form of the housing provides, moreover, the advantage that, apart from the connections, all parts of the switch can be closed by one single cover which may be riveted and consists of insulating material. The housing can, due to the reduced depth of the recess, easily be produced from a ceramic insulating material, preferably Steatite. The detector can thus be closely linked with the temperature of the heating elements of the plate but transmit relatively little heat to the switch head with a snap switch, which can therefore be in the form of a precision switch and can operate with a switching path of only one hundredth of a millimeter. The transmission rod can therefore influence the snap switch directly. Thus, using an extremely simple and sturdy type of construction a temperature limiter having maximum response sensitivity is provided. There are also relatively few problems in providing the terminal connections in the region of the unheated central zone.

BRIEF DESCRIPTION OF THE DRAWINGS

The present invention will now be further described, by way of example, with reference to the accompanying drawings, in which:

FIG. 9 shows a section through another embodiment of an electric cooking plate, and, FIG. 10 shows a view in the direction of the arrow X in FIG. 9.

DETAILED DESCRIPTION

Figures 1, 2:
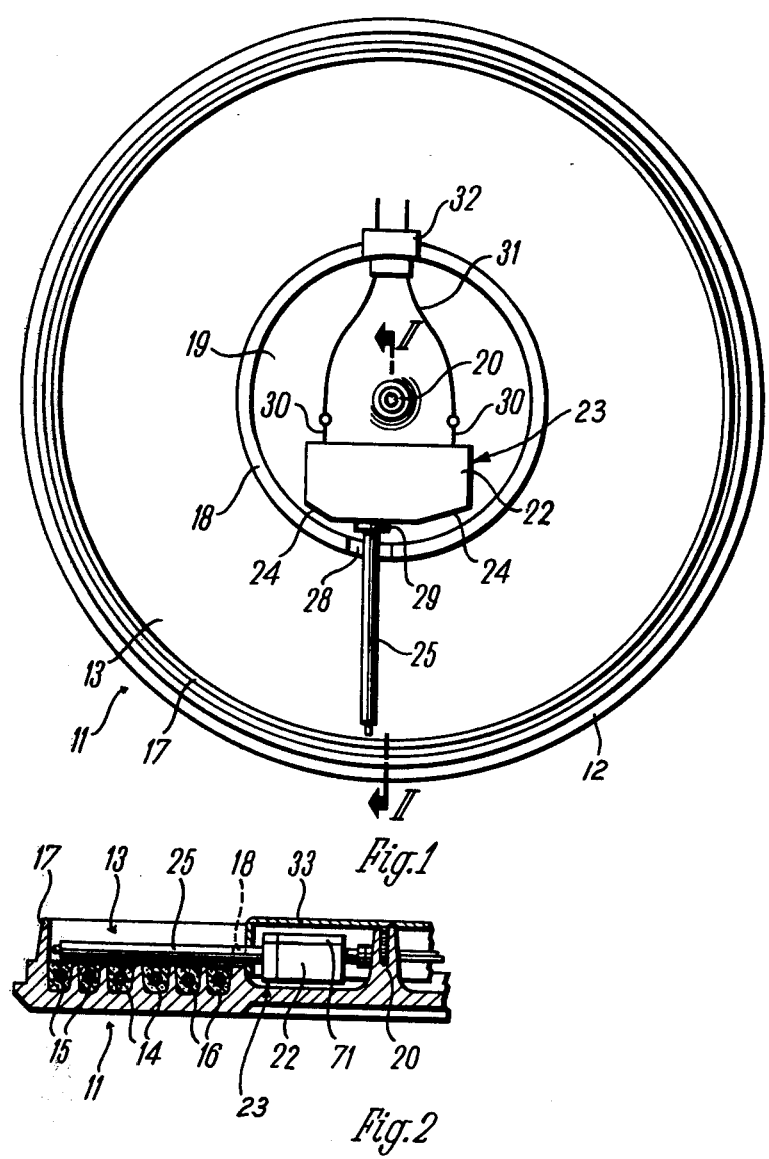
FIG. 1 shows an electric cooking plate, viewed from beneath having a temperature limiter according to the invention.
FIG. 2 shows a section on the line II—II in FIG. 1.

FIG. 1 shows an electric cooking plate 11, viewed from below, which, as can also be seen from FIG. 2, comprises a support plate 12 made of cast material and having a heating ring region 13 on its underside. Cover 33, shown in FIG. 2, is omitted from FIG. 1 in order to reveal elements disposed thereunder. Heating conductors 15 in the form of helices are disposed in helical grooves 14 in this region, and are embedded in an insulating substance 16 which fills the grooves. The heating ring region 13 is defined to the outside by an annular rib 17 and to the inside by an annular rib 18. Within the annular rib 18 is located an unheated central zone 19, in the middle of which is cast a central eye 20. This central eye 20 enables the cover to be mounted over the central zone 19, as shown in FIG. 2. From the above it will be evident that the present invention basically is concerned with a standard electrical cooking plate.

The housing 22 of a temperature limiter 23, which housing accommodates a switch 21 (see FIG. 4), is diposed in the region of the unheated central zone 19. The housing 22 is composed of insulating material, for example, Steatite, and has a substantially flat, square shape with corners 24 which are chamfered, the housing being arranged such that corners 24 are adjacent annular rib 18. As can be seen from FIG. 2, the depth of the housing 22 is very small and the radial dimensions, i.e., with respect to central zone 19, are also small, the housing 22 being comfortably disposed between the cental eye 20 in the middle of the unheated central zone 19 and the annular rib 18. The sloped-off corners 24 contribute to the adaptation of the housing shape to the central zone.

An elongate temperature detector 25 projects from the housing and extends through a gap 28 in annular rib 18. The detector 25 projects, somewhat eccentrically, from the side of the housing between corners 24 and comprises an expansion sleeve 26 within which is arranged a transmission rod 27. The expansion sleeve 26 is made of material having relatively high thermal co-efficients of expansion and rod 27 is composed of material having relatively small thermal co-efficients of expansion: e.g., a ceramic rod.

FIG. 1 shows that the rod-shaped temperature detector 25 projects over the heating ring region 13 away from the unheated central zone 19 in a substantially radial manner (though angled somewhat to the side with respect to a radius). In the course thereof it runs through the gap 28 in the annular rib 18, the flat construction of the housing enabling the temperature detector 25 to run directly adjacent to the underside (in the drawings the upper side) of the insulating material 16 which surrounds the heating conductors 15. In fact, in an advantageous manner, a certain amount of heat contact occurs, though this of course must not be too strong on account of the expansion movements of the expansion sleeve 26. The length of the detector 25 is, however, chosen such that sufficient space remains for the expansion of the rod between the free end temperature detector with its adjusting screw 29 which connects the expansion sleeve 26 to the transmission rod 27, and the outer annular rib 17.

Terminals 30, which are connected to lines 31, lead away from the rear side of the housing 22, which side lies opposite the side from which the temperature detector 25 projects. The lines 31 lead out of the unheated central zone 19 through an insulating passage 32. As can be seen from FIG. 2, the central zone is sealed off by means of a flat, box-shaped cover 33 which engages within the inner annular rib 18. The cover 33 together with a standard lower plate cover (not shown) is secured to support plate 12 by means of a screw screwed into the central eye 20. The cover 33 serves to protect that part of the temperature limiter containing the switch, from dust and other disturbing environmental influences. The lines 31 extend through central zone 19 one on each side of the central eye 20, this being easily effected as the terminals 30 are located near the two narrow sides of the housing 22: i.e., towards the ends of the said rear side of the housing.

Figure 3:
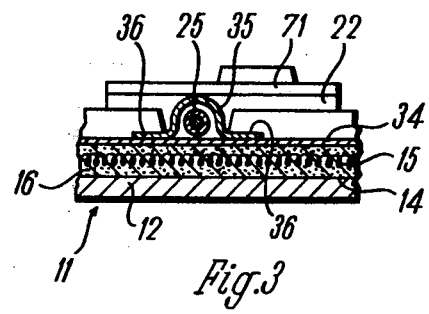
FIG. 3 shows a portion of a modified embodiment in section, the line of section running at right angles to that of FIG. 2.

FIG. 3 shows a modified embodiment of the present invention, wherein the heating ring region of the electric cooking plate 11 is covered by a metal sheet 34 but the construction of the unheated central zone and the temperature limiter 23 is otherwise the same as shown in FIGS. 1 to 4. The metal sheet 34 has the annular shape of the heating ring region 13, but is somewhat larger so that it can be pressed in between the annular ribs 17 and 18, friction retaining the sheet in position. This metal sheet 34 lies closely over the underside of the insulating material 16 and seals it off completely from outside influences (e.g., the collection of dust). At the same time this metal sheet, which is in heat conducting contact either with the insulating material or the ribs, which project therebetween and separate the grooves 14 from one another, provides an ideal heat transmission surface for the close thermal coupling of the temperature detector 15 with the temperature of the heating ring region. The temperature detector 25 thus runs closely beneath (in the drawing above) this metal sheet 34. In the embodiment shown, three-quarters of the detector 25 is enclosed by a cover 35 which has the cross-sectional shape of a large omega and is bent from sheet metal. the cover 35 is extended in accordance with the longitudinal expansion of the temperature detector 25, and with its flange 36 lies on the metal sheet 34 where it can be secured, for example by spot welding. It is also possible to form a direct and advantageous connection between the cover 35 and the cover 33, so that the entire temperature limiter is enclosed and its thermal coupling with the electric cooking plate is even closer. However, it is only the temperature detector which is exposed to the high temperature of the heating ring region and it can thus react very rapidly to alterations in the temperature of the heating conductors, while the housing 22, together with the temperature-sensitive switch, is situated in the region of the unheated central zone: i.e., in a colder region. It should therefore be recognized that both the cover 35 and the metal sheet 34 serve to protect the electric cooking plate and the temperature limiter from dirt or other environmental influences and also to effect the close thermal coupling of the temperature detector with the temperature of the heating conductors with as little thermal lag as possible.

Figure 4:
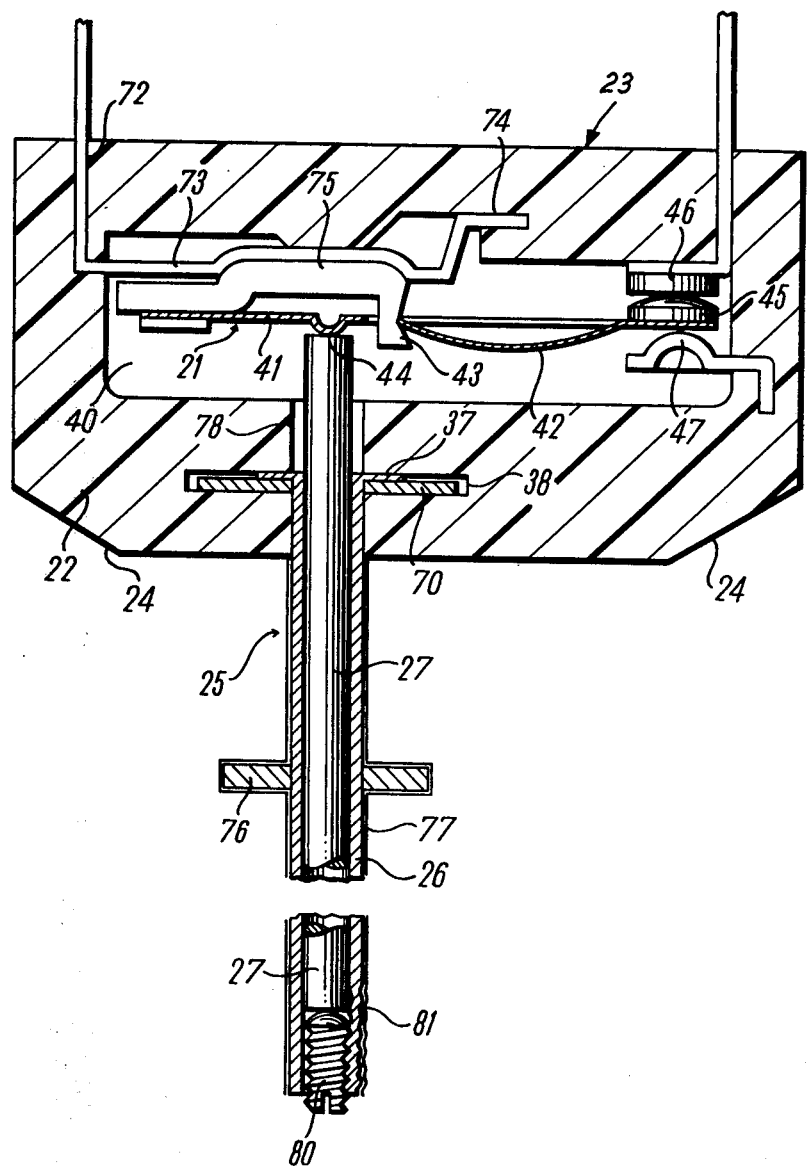
FIG. 4 shows a longitudinal section through a temperature limiter.

Individual parts of the temperature limiter can be seen from FIG. 4. The temperature detector 25, which has already been described, projects through an opening in the housing 22. The expansion sleeve 26 has a flange 37, on which is mounted a disc 70 which serves to enlarge the flange. The housing is made in one piece of ceramic insulating material: e.g., Steatite, and has a recess 40, which is open to one side: i.e., at right angles to the expansion element, and subsequent to mounting of the switch is sealed off by means of an insulating cover 71 (FIG. 2). The flange 37 having the disc 70 is inserted from the side into a slot 38 in the housing in the region of the opening 78 for the temperature detector, and thus secures said detector in position.

The switch 21 is disposed in the form of a snap switch in the recess 40. The snap switch 21 has a snap spring 41 having a spring tongue 42 bent out thereof, which tongue is supported by a support bearing 43. The actuation point 44, against which the transmission rod 27 engages, lies relatively close to the support bearing 43, so that, as a result of the short lever arm, the switch switches with great sensitivity: i.e., its switching differential between switching off and switching on again lies on a path at the actuation point 44 of approximately 1/100 mm.

On its free end the snap spring 41 carries a contact 45, which co-operates with a counter-contact part 46 which is inserted from the side into a slot in the housing and is thereby secured and forms a unitary construction with a terminal 30. A shoulder 47, which is also secured by insertion in a slot in the housing and is bent from sheet metal, serves to support the snap spring when the contacts 45, 46 are in the open position, the shoulder 47 being disposed such that the snap spring 41 covers only that path which is absolutely necessary just to open the contacts. The sensitivity of the switch is also improved thereby. The other terminal 30 is in the form of a bent carrier 73 constructed from metal strip. The carrier 73 is inserted into a slot 72 in the housing, leading out from the recess 40, and the end of the carrier 73, which lies in the recess 40 is secured by lateral insertion into a slot 74. The base part 75 of the snap switch 21 is mounted on the sheet metal strip 73 and one end of the base part 75 carries the support bearing 43, the snap spring being mounted on the other end. The carrier 73 is supported against the housing in the region of the actuation point 44.

The housing is substantially rectangular and has the aforementioned sloped-off or chamfered corners 24.

The temperature limiter described hereabove provides a very simply constructed and extremely sensitive temperature limiter which is still satisfactory with the minimum dimensions. The temperature limiter shown in FIG. 4 can, for example, with the expansion sleeve having an effective length of only 45 mm at a temperature difference of 360° as compared with room temperature, afford an expansion path of approximately 35/100 mm. With a switching path of 1/100 mm between switching on and off, the hysteresis of the temperature limiter is approximately 10°. This is extremely small as compared with approximately 80° which is to be reckoned with when using bi-metal switches. Further, no lever transmission is necessary, as the transmission rod can directly act upon the actuation point 44 of the snap spring 41. Mention should also be made of the fact that although the expansion sleeve 26 advantageously has a circular cross section for reasons of production, it may also have a different cross section: e.g., flattened on one side or square, so that it is enabled in particular to match the surface of the heating ring region.

The above described embodiment of the housing of the temperature limiter, which is not divided at right angles to the temperature detector and thus to the main flow of force ensures that in the direction of force no elasticities occur which could lead to inaccurate switching. The fact that the switch and the temperature transmission member are generally kept in power connection by the snap spring 41 also ensures that inaccurate switching does not occur.

It can be seen from FIG. 4 that a heat transmission member 76 in the form of a sheet metal disc has been slipped onto the expansion sleeve 26. This provides a large heat transmission surface for the collection of radiant and convective heat transmission and, by means of contact with parts of the cooking plate or of the metal sheet 34, heat can also be transmitted to the expansion sleeve by conduction. The disc 76 may advantageously be inclined in a plane parallel to the cooking plate.

Furthermore, it is preferred to reduce the heat transmission resistance of the temperature detector, possibly also of the heat transmission members, by the appropriate surface treatment. Suitable for this purpose is a coating having a coarse varnish coat 77, which is resistant to great heat and substantially improves the heat transmission properties of the relatively smooth and shiny surface of the expansion sleeve, which for the most part is composed of refined steel.

Figure 5:
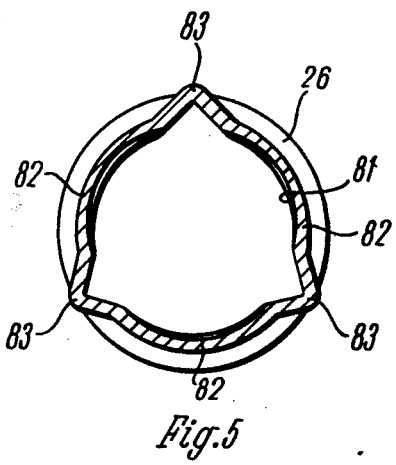
FIG. 5 shows an enlarged view of the expansion sleeve, viewed from its free end.

As can be seen from FIGS. 4 and 5, an adjusting screw 80 is screwed into the lower end of the expansion sleeve 26, which comprises a very thin, stainless steel pipe. The thread 81 which is provided for this purpose in the expansion sleeve 26 is produced by pressing. Although this is the process requiring the least wall thickness, it may occur that during pressing the pipe is almost severed in the region of the top of the thread. The production of the thread is therefore effected in that it is pressed against a thread core by a longitudinally split spindle, which presses three portions 82 of the pipe inwards leaving longitudinal protrusions or cross pieces 83 in between. There is little or no thread pressed into these parts from within and they thus form a longitudinal bond in the region of the threaded portions and, more particularly, have at their disposal the full thickness of material for the thread at either side of the triangular cross piece. This feature also contributes to the provision of a rapidly and accurately responding temperature limiter, since it makes it possible for the expansion sleeve to be very thin in form and for it therefore to display little time lag in reaction to heat.

The transmission rod 27 is advantageously produced from ceramic material. Over the whole temperature range this material exhibits almost no heat expansion, which feature, in the case of other materials whose heat expansion is slight, is generally to be found only within a certain temperature range. A further advantage of the ceramic rod is its very low heat capacity, and this feature also increases the sensitivity of the temperature limiter.

Figure 6:
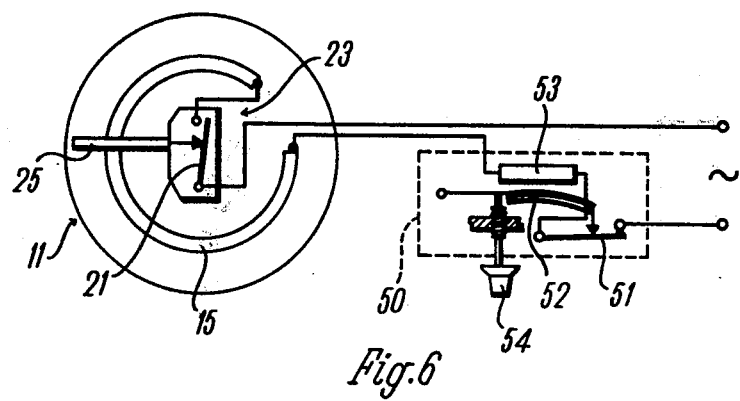
FIG. 6 shows a schematic switching diagram of the temperature limiter in co-operation with an energy regulator.

FIG. 6 shows the switching of the temperature limiter 23 in co-operation with an energy controller 50. The energy controller 50 is a so-called quantizing energy controller, which supplies to the heating conductors 15 of the electric cooking plate the energy, and in every case it is the full energy, in power pulses whose frequency and duration determine the average amount of power supplied. This energy controller may be of a standard construction, and in the schematic diagram shown has a switch 51, which is usually closed and can be opened by a bimetal member 52 as the latter expands in the heat. The bimetal member 52 is heated by means of a control heating resistor 53. The action of the bimetal member 52 on the switch 51 can be regulated by means of an actuation knob 54, which sets the desired power. In the illustrated example, the switch 51, the control heating resistor 53, the heating conductors 15 of the cooking plate and the switch 21 of the temperature limiter are switched successively into the total circuit of the cooking plate. This signifies that the circuit, and thus the heating of the cooking plate and of the energy regulator, is interrupted when either the switch 21 or the switch 51 (or both) is opened. A basic feature is that, as a result of its construction and mounting on the cooking plate, the temperature limiter 23 displays a characteristics which is such that, when said limiter 23 becomes effective its switching period between switching on and off is in the same order of magnitude as the switching period of the energy controller. This means that, as compared with the standard temperature limiters, the temperature limiter 23 must have a very short switching period. This is achieved on the one hand by the close coupling of the temperature detector 25 with the heating ring region 13 and thus with the temperature of the heating conductors 15, and on the other hand by the very slight temperature difference between switching on and off. The temperature limiter 23 according to FIG. 4 in the arrangement according to FIGS. 1 to 3 is best suited to this purpose. However, it is also possible to use other temperature limiters which fulfill this object. Such limiters are, for example, described in applicants co-pending application, now U.S. Pat. No. 4,050,044. Modifications may also be made with respect to the energy regulator and the switching. For example, the control heating resistors 53 may be disposed in a parallel circuit which, however, is also dependent on the switch 51, and the temperature limiter does not have to switch the full power but may switch partial power, although it is extremely advantageous when it is used for switching the full power.

Figure 7:
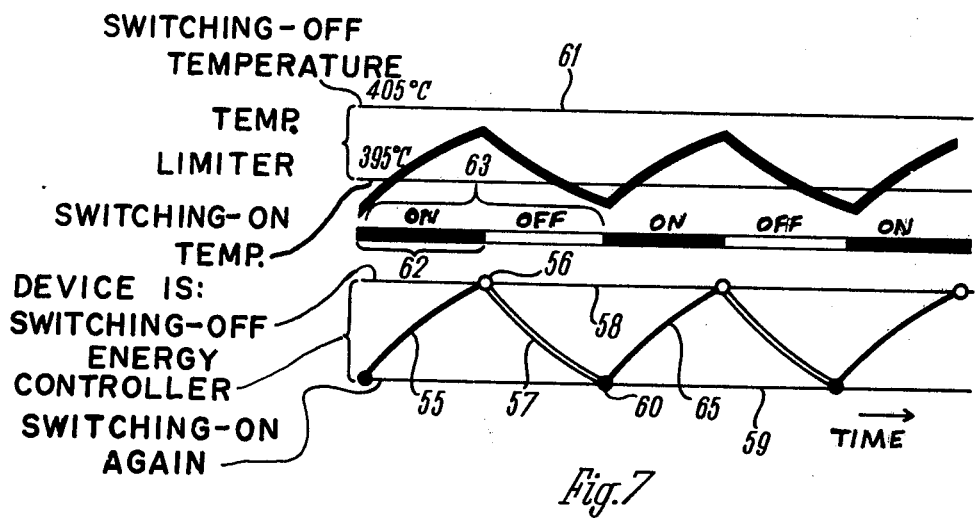
FIG. 7 shows a schematic diagram, in which in each case the temperature is plotted against the time and which in its upper portion shows the ratios at the temperature limiter and in its lower portion the ratios at the energy regulator.
Figure 8:
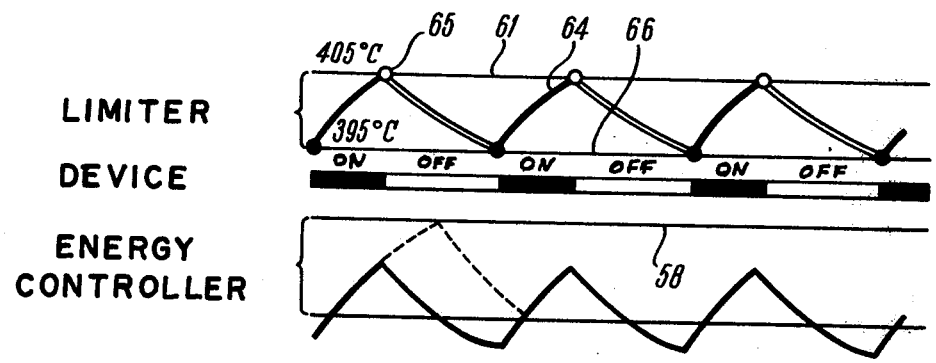
FIG. 8 shows a diagram according to FIG. 7 in a different operational state.

With reference to FIGS. 7 and 8 the mode of operation of the control device according to FIG. 6 is to be described. A representation of the normal mode of operation of a cooking plate is shown in FIG. 7, wherein operation is effected at a temperature lower than the switch-off temperature of the temperature limiter, which may for example be 405° C. When the switch 51 of the energy regulator is in its on position, the heating resistors 15 and 53 become effective and the temperature of the bimetal of the energy regulator increases (lines 55) until the switch off point 56 of the energy regulator, which point can be adjusted by way of the actuation knob 54, has been reached. The switch 51 opens and the heating resistors 15 and 53 are switched off so that the temperature of the bimetal decreases (line 57) until the switching hysteresis (temperature difference between the set switch-off temperature 58 and the reconnection temperature 59) is bridged and at the reconnection point 60, the energy regulator reconnects the switch 51, thus initiating a new quantizing cycle. This is the usual mode of operation of an energy regulator. The switching period between two switch-off points 56 or reconnection points 60 is generally less than a minute, so that as a result of the heat lag of the cooking plate, uniform heating is possible. However, the switching periods depend on the respective operational state. The varying heat dissipation from the cooking plate as a result of the differences in the type of cooking or frying vessels and in their contents (the temperature limiter does not become effective until at least frying is taking place) has a particularly great influence on the switching periods.

It can be seen from FIG. 7 that the temperature limiter in the functional example shown there does not respond. In fact, the energy controller 50 is adjusted to such a high level that the cooking plate is heated until it closely approaches the permissible limit: i.e., the temperature at which the temperature limiter becomes effective. However, the switch 21 of the temperature limiter 23 constantly remains in an on position, because the switch-off temperature limit 61 of the temperature limiter has not been reached. However, it can be appreciated that, as a result of the very close coupling between elements 15 and detector 25 the temperature oscillations produced as a result of the beats in the supply of energy, which oscillations are in a somewhat weaker form, are imparted to the detector 25 of the temperature limiter 23. This would not be so in the case of a temperature limiter wherein the coupling was not so close. In that case, the upper line in FIG. 7, i.e., the temperature of the cooking plate detected by the temperature limiter, would run on a substantially horizontal course. The line between the two saw-tooth type curves shows the switch-on duration 62 and the switching period 63. The quotient of these two durations indicates the relative switch-on duration and thus the set partial power.

By way of example, FIG. 8 shows an instance of the temperature of the cooking plate being enabled to rise while the setting of the energy controller remains unaltered, for example by a cooking vessel being removed from the cooking plate or by a larger cooking vessel, which uses more heat, being replaced by a smaller vessel. When the circuit is switched on, the temperature (line 64) detected by the temperature limiter increases more sharply, i.e., more rapidly, than in FIG. 7, and reaches the fixed switch-off temperature limit 61. In this case the switch-off point 65 of the temperature limiter is reached before the heating resistor 53 of the energy regulator has heated the bimetal sufficiently for the switch-off point or the switch-off temperature limit 58 of the energy controller to have been reached (this would be effected by following the dotted line in FIG. 8).

Thus, it can be seen that by opening switch 21, the temperature limiter 23 switches off the circuit of the energy regulator and of the cooking plate at the switch-off point 65. The switch 51 of the energy controller remains constantly in the on position, but as a result of the switching-off of the heating conductors 15 and 53 the temperatures at the cooking plate and also at the bimetal 52 decrease. When the reconnection temperature limit 66 of the temperature limiter has been reached, said limiter switches the switch 21 on again and the cooking plate and the energy controller are again supplied with current, since the energy controller had at no time switched off. It can be seen from the representation of the power pulses that in spite of the unaltered position of the energy regulator, the switch-on duration and above all the relative switch-on duration has been reduced. It can therefore be seen that the temperature limiter takes over the quantizing function of the energy controller once a certain temperature limit has been reached, and then decreases the power gently and gradually to a level which is such that the maximum permissible temperature limit is not exceeded. The combination is thus produced of two quantizing switching members, which are advantageously independent of one another with respect to space. One of these members is adjustable and it alone is effective below a certain limiting temperature and is not affected thereby, while the other switching member takes over the quantizing function of the first member when a certain limiting temperature has been reached. In this context it is important that, within certain limits, the predetermined switching periods of the temperature limiter and the energy controller lie in the same order of magnitude. The ideal situation is produced when both predetermined switching periods are the same. However, it is also possible for them to differ from one another partially or in many ways, as long as no disturbing temperature oscillations are thereby transmitted to the cooking vessel. On no account is the situation to arise wherein an extremely long switching period of the temperature limiter causes the cooking plate and thus also the energy controller to be put out of operation for a long time, with the result that the housewife believes she has engaged too little power because the cooking vessel has cooled off, and subsequently turns the power regulator to a higher level. Initially that would be of no help at all and when the next switch-off of the temperature limiter occurred, the switch-off period would then be even longer. Mention here of a predetermined switching period is intended to signify the switching period of the respective switching member on its becoming effective. It can, for example, be seen from FIG. 7 that although the actual switching period of the energy controller is short and is of finite length, the actual switching period of the temperature limiter is theoretically infinitely long since said limiter never becomes effective. However, the predetermined switching period of the temperature limiter, which may for example be seen in FIG. 8, is in the order of magnitude of that of the energy controller.

By means of the present invention a control device is provided which is particularly easy for the housewife to view and which is nevertheless extremely effective. The housewife sets the energy controller at a certain power level and, should a maximum temperature be exceeded, this power is reduced gradually. As is known, the setting of levels of power is preferred by many housewives, since the setting of a temperature level such as is found in automatic regulators, requires an adaptation on the part of the housewife and a certain degree of abstract thought. The control device is also very simple with respect to construction, since a temperature limiter which meets the requirements, such as can be seen in FIG. 4, is very easy to produce, and in the case of an energy controller too there is no need for great expenditure on construction. However, only two purely electrical lines are required between the energy controller and the cooking plate, which represents a structural advantage as compared with an automatic regulator.

FIGS. 9 and 10 show an electric cooking plate 11' corresponding to the plate according to FIGS. 1 and 2, and the same parts bear the same reference numerals. The cooking plate has a lower annular cover sheet 90, which seals off the heating ring region 13, inclusive of the temperature detector 25, towards the lower side but leaves the central zone 19 free. The cover sheet 90 abuts on the inside against the inner annular rib 18 and forms a seal against the penetration of convective heat into the central zone. A three arm star-shaped cover part 92, which is stamped from sheet metal fixes the cover in position its arms 94 emanating in a star-shape from a central portion and pressing the cover part against the annular rib 18. A nut, which is screwed onto a central bolt 95 which in turn is screwed into the central eye 20, presses the cover part 92 upwards. Large air passage areas which are produced between the arms 94 enable the housing 22 of the temperature limiter, which housing contains the switch, to be cooled and thus ensure that the switch-off temperature of the temperature limiter can be set at a high level without causing damage to the switch, so that a large amount of power can be transmitted even to poor cooking vessels. It is also possible to construct the cover sheet 90 such that it is connected to the cover part 92. The cover sheet 90 would then, as illustrated, abut against the annular rib 18 and be pierced in the central region.

The present invention may be embodied in other specific forms without departing from the spirit or essential attributes thereof and, accordingly, reference should be made to the appended claims, rather than to the foregoing specification as indicating the scope of the invention.

What is claimed is:

1. An electric cooking plate, comprising:
   a heat conductive support plate;
   means for electrically heating said support plate disposed thereon so as to form a heating element region and an unheated central zone;
   electrical circuit means for said heating means;
   a temperature limiter having first means for switching said heating means on and off in response to small temperature differences, said limiter being effective in a region of a limiting temperature; and,
   an adjustable energy controller for regulating power supply to the heating means through the temperature limiter, having second means for switching the power on and off with a relative switch-on duration varying in dependence on an adjusted setting and upon the temperature limiter becoming effective, the period of time between successive switch-offs of the temperature limiter being of the same order of magnitude as the relative switch-on duration of the energy controller, said first and second switch means being independently operable.

2. The electric cooking plate of claim 1, in which the energy controller and the temperature limiter are units which are disposed separately from one another.

3. The electric cooking plate of claim 1 in which both the energy controller and the temperature limiter are capable of switching the full power of the electric cooking plate.

4. The electric cooking plate of claim 1 in which the switch-on times, the switch-off times and the switching periods of the energy controller and of the temperature limiter are such that, in the region of the limiting temperature, the switch-on times of the temperature limiter are shorter than the time which would be necessary to switch off the energy controller.

5. The electric cooking plate of claim 1, in which when the limiting temperature has been reached, the switching periods of the temperature limiter are of approximately the same order of magnitude as the switching periods of the energy controller before the limiting temperature had been reached.

6. The electric cooking plate of claim 1, further comprising:
   a housing for the temperature limiter, disposed on the underside of the unheated central zone; and,
   a temperature detector projecting out from the unheated central zone and extending over the underside of the heating element region in close proximity thereto.

7. The electric cooking plate of claim 6 in which the housing has projections which engage said unheated central zone to maintain clearance therebetween.

8. The electric cooking plate of claim 6, further comprising an embedding material in the heating element region of the plate and heating conductors located in said material, the temperature detector extending directly beneath the embedding material.

9. The electric cooking plate of claim 6 in which the temperature detector has a coating which increases the heat absorption.

10. The electric cooking plate of claim 6, wherein said temperature detector comprises:
an expansion sleeve having at least one flange;
a rod arranged within said sleeve and having a different co-efficient of expansion from said sleeve;
a one-piece housing of a solid insulating material having a laterally open recess with counter-contact slots adjacent thereto and further, having a laterally open passage with a flange slot adjacent thereto, said sleeve being received in said laterally open passage with said at least one flange being inserted in said flange slot to fasten said sleeve; and,
a snap switch having a snap spring and a counter-contact inserted in said laterally open recess, said counter-contact including fastening parts extending into said counter-contact slots, said rod being spring biased through engagement with said snap spring.

11. The electric cooking plate of claim 10, in which the snap switch has a carrier comprising a sheet metal strip, which leads out of the cavity through an attachment slot and forms a terminal of the snap switch, the other end thereof being inserted in an attachment slot in the housing.

12. The electric cooking plate of claim 11, in which the carrier is supported against the housing in the region of an extension of the longitudinal axis of the rod.

13. The electric cooking plate of claim 10, in which a disc is mounted on the flange and inserted into the flange slot in the housing together therewith.

14. The electric cooking plate of claim 10, in which the location where the rod engages the snap spring is located close to a supporting bearing for the spring of the snap switch.

15. The electric cooking plate of claim 10, in which the snap spring is pretensed such that it maintains its contact pressure even when the snap switch has been switched off.

16. The electric cooking plate of claim 10, in which an adjusting screw is screwed into the free end of the expansion sleeve, which screw supports the rod against the snap spring.

17. The electric cooking plate of claim 16 in which the free end of the expansion sleeve is provided with an internal screw thread which is formed by deformation of the sleeve, the deformation leaving cross-pieces of the sleeve projecting outwardly.

18. The electric cooking plate of claim 17 in which the portions which lie between the outwardly projecting cross-pieces and which carry the thread, have been pressed in by means of a threaded pressing tool.

19. The electric cooking plate of claim 1 in which a heat transmission member is mounted on the temperature detector.

20. The electric cooking plate of claim 19 in which the heat transmission member is a disc slipped onto the temperature detector.

21. The electric cooking plate of claim 10 further including a cover for said recess and said passage.

22. An electric cooking plate, having heating elements and electrical circuit terminal connection means, comprising:
a substantially closed heat conductive support plate, having a heating element region and an unheated central zone;
a temperature limiter disposed on the underside of the cooking plate;
a housing disposed on the underside of the unheated central zone in which said temperature limiter is mounted; and,
a temperature detector connected to said temperature limiter and projecting out from the unheated central zone and extending over the underside of the heating element region in close proximity thereto.

* * * * *